F. S. BALDWIN.

CALCULATING MACHINE.

APPLICATION FILED APR. 20, 1914.

Reissued Dec. 8, 1914.

13,842.

3 SHEETS—SHEET 1.

Witnesses

Stuart Hilder.

Frances W. Anderson.

Inventor

Frank S. Baldwin

By E. W. Anderson & Son his Attorneys

F. S. BALDWIN.

CALCULATING MACHINE.

APPLICATION FILED APR. 20, 1914.

Reissued Dec. 8, 1914.

13,842.

3 SHEETS—SHEET 2.

Witnesses

Stuart Wilder.

Frances W. Anderson.

Inventor

Frank S. Baldwin

By E. W. Anderson & Son

Its Attorneys

F. S. BALDWIN.

CALCULATING MACHINE.

APPLICATION FILED APR. 20, 1914.

Reissued Dec. 8, 1914.

13,842.

3 SHEETS—SHEET 3.

Inventor

Frank S. Baldwin

Witnesses

Stuart Hilder.

Francis W. Anderson.

By C. W. Anderson for his Attorneys

UNITED STATES PATENT OFFICE.

FRANK S. BALDWIN, OF NEW YORK, N. Y., ASSIGNOR TO MONROE CALCULATING MACHINE COMPANY, A CORPORATION OF NEW YORK.

CALCULATING-MACHINE.

13,842. Specification of Reissued Letters Patent. Reissued Dec. 8, 1914.

Original No. 1,080,245, dated December 2, 1913, Serial No. 703,901. Application for reissue filed April 20, 1914. Serial No. 833,316.

DIVISION B.

*To all whom it may concern:*

Be it known that I, FRANK S. BALDWIN, a citizen of the United States, and resident of New York, in the county of New York and State of New York, have made a certain new and useful Invention in Calculating-Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
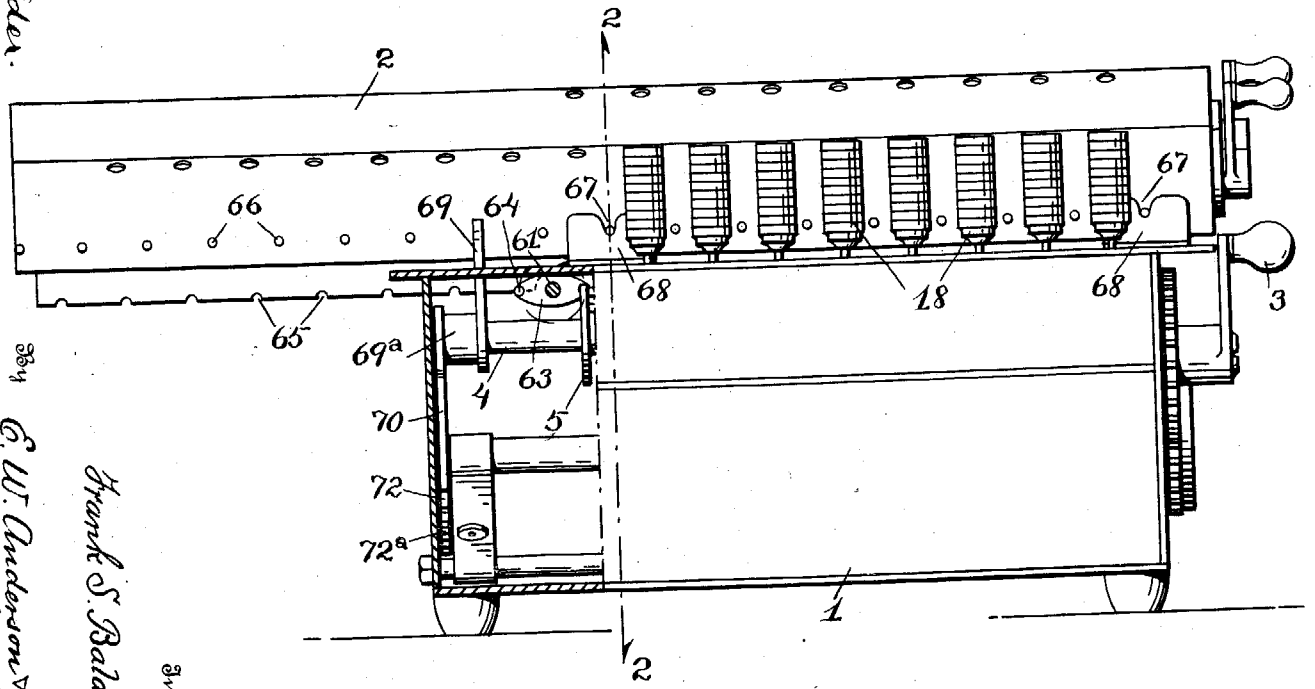
Figure 2:
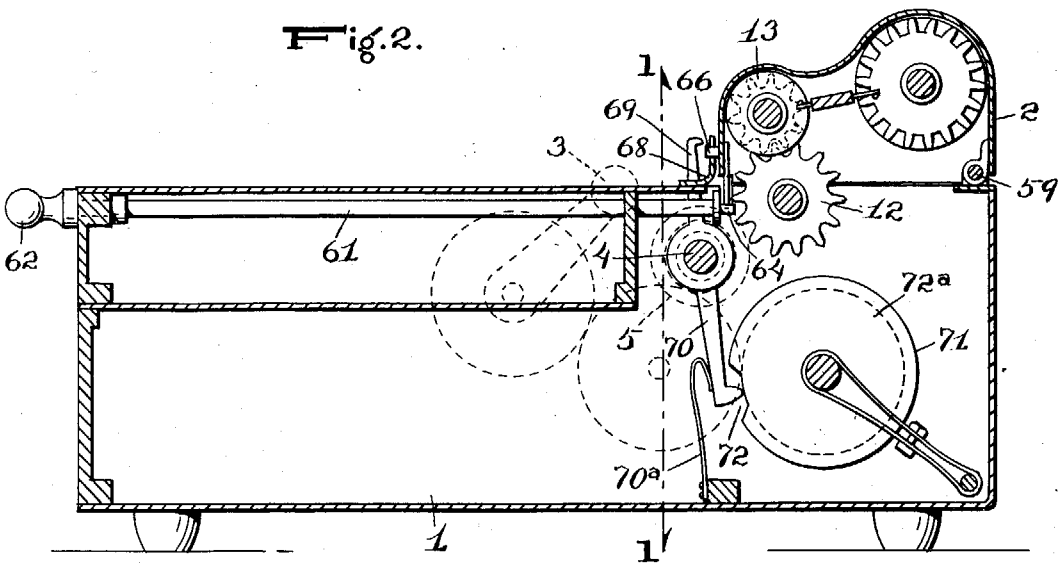
Figure 5:
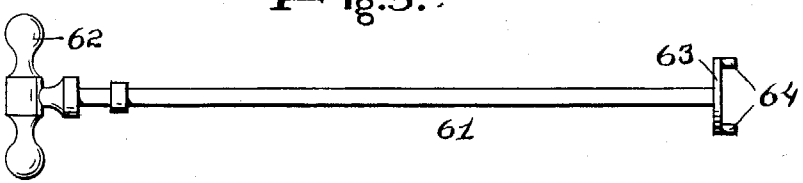
Figure 4:
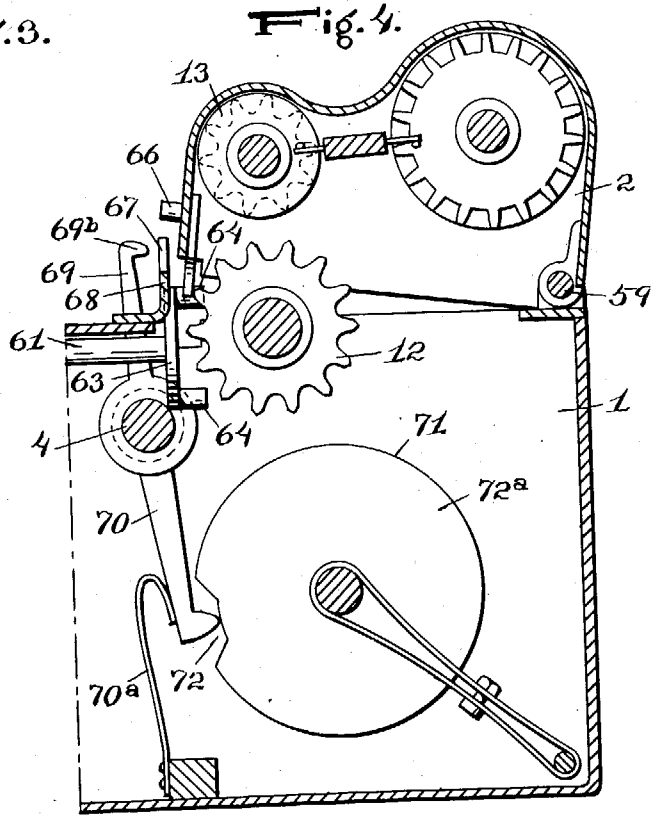
Figure 3:
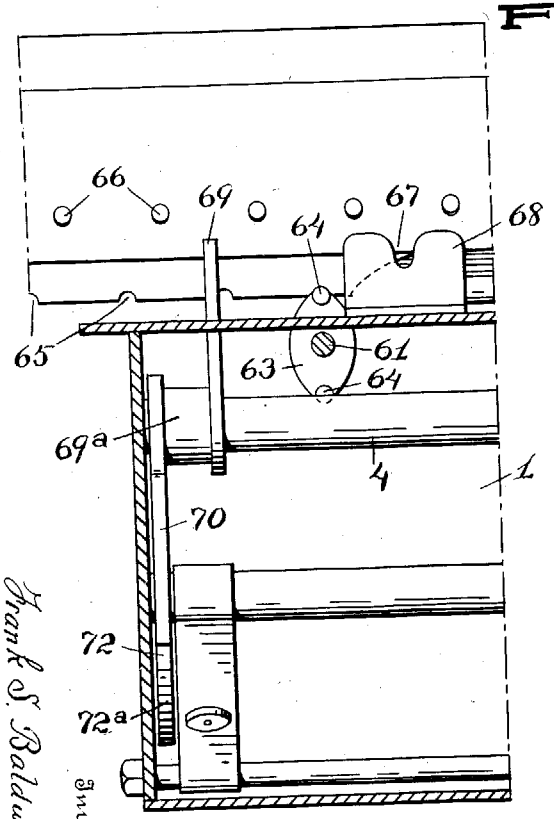

Figure 1 is a front view of the machine, partly in section on the line 1—1, Fig. 2. Fig. 2 is a section on the line 2—2, Fig. 1. Fig. 3 is a partial section on the same line as Fig. 1, showing the carriage in raised position. Fig. 4 is a partial section on the same line as Fig. 2, with the carriage in raised position. Fig. 5 is a detail plan view of the carriage shift rod or shaft.

The invention has relation to calculating machines, having a movable carriage, and particularly to means for moving said carriage, and it consists in the novel construction and combinations of parts, as hereinafter set forth.

In the accompanying drawings, illustrating the invention, the numeral 1 designates a casing, 2 an endwise movable carriage wherein the registering wheels or mechanism is located, and 18 the keyboard or series of depressible keys for operating the setting up mechanism.

The machine to which the invention is usually applied is shown in the co-pending application for re-issue, of which this application is a division, executed of even date herewith.

The carriage 2 is pivoted and movable endwise upon a longitudinal shaft 59, and located within said carriage are a series of numeral wheels 13, upon which is registered the calculation through the medium of setting up mechanism and carrying mechanism, the former including usually primary actuating wheels 5, operating a series of intermediate gear wheels 12, mounted upon a shaft of the casing and with which the numeral gear wheels 13 are normally in engagement. This carriage is provided with means whereby it may be moved endwise or longitudinally when it is desired to carry out the calculation to a greater number of figures than there are series of banks of keys, this means consisting usually of a rotary shaft 61, provided forwardly of the casing with an operating handle 62 and at its rear end with a double crank arm 63, pins 64 being located at the ends of the arms 63 and having engagement successively with a longitudinal series of notches 65, at the lower forward edge of the carriage casing.

Upon operation of the crank handle 62, the pin 64 engaged with one of the notches 65 will lift the carriage upon its pivot and shift it one space, when the opposite pin 62 will be in position for engagement with the next notch, to shift the carriage another space.

Means are provided to limit the movement of the carriage, consisting usually of a series of forward projecting pins 66 of the carriage, two of said pins when the carriage is in lowered or normal position resting in open-top seats or notches 61 of upward extensions 68 of the casing of the machine. As the carriage is raised upon its pivot and shifted space by space, the pins will be lifted with the carriage from their seats and the next pins in line will be engaged with said seats.

Means are provided to hold the carriage down or to lock the carriage in depressed position, said means being released at the start and finish of the turn of the crank handle 3, and consisting usually of an upward extending hook arm 69, the hub $69^a$ of which is loose upon the primary wheel shaft 4, the upper hook end $69^b$ of said arm being located normally over one of the pins 66. When the turn of the crank handle 3 is completed, and the shaft of the carrying mechanism is rotated completely, a downward extending hook arm 70, upon the hub 69[a], will be caused by its spring 70[a] to engage a notch 72 of a cam 72[a] and move the upward extending hook arm from engagement with said pin, to release the carriage, which may now be shifted.

The hook arm 70 has engagement with said notch of the cam at the start and at the finish of the turn of the crank handle 3, and throughout the turn of said handle has engagement with the circumferential surface 71 of the cam, for the purpose stated.

What I claim is:

1. In a calculating machine, the combination with a casing having a series of primary wheels, an endwise-shiftable pivoted carriage having a series of registering wheels engaging said primary wheels, and pins upon the carriage normally engaging successively an open-top seat of said casing, of rotary crank means for raising the carriage upon its pivot and shifting it endwise in either direction.

2. In a calculating machine, the combination with a casing having a series of primary wheels, an endwise-shiftable pivoted carriage having a series of registering wheels engaging said primary wheels, and pins upon the carriage normally engaging successively an open-top seat of said casing, of a rotary crank rod provided at one end with a manually operable device and at the other end with a carriage-engaging device, to raise the carriage upon its pivot and shift it endwise in either direction.

3. In a calculating machine, the combination with a casing having a series of primary wheels, an endwise-shiftable pivoted carriage having a series of registering wheels engaging said primary wheels, and open-bottom notches, and pins upon the carriage normally engaging successively an open-top seat of said casing, of a rod provided at one end with a manually-operable device and at the other end with means engaging said open-bottom notches, to raise the carriage upon its pivot and shift it endwise in either direction.

4. In a calculating machine, the combination with a casing having a series of primary wheels, an endwise-shiftable pivoted carriage having a series of registering wheels engaging said primary wheels, and open-bottom notches, and pins upon the carriage normally engaging successively open-top seats of said casing, of a rod provided at one end with an operating crank and at the other end with a double crank arm having pins engaging said open-bottom notches, to raise the carriage upon its pivot and shift it endwise in either direction.

5. In a calculating machine, the combination with a casing having a series of primary wheels, an endwise-shiftable pivoted carriage having a series of registering wheels engaging said primary wheels, and means normally limiting the movement of the carriage, of rotary crank means for raising the carriage upon its pivot to disengage the limiting means, shifting the carriage endwise in either direction, and lowering the carriage to reëngage the limiting means.

6. In a calculating machine, the combination with a casing having a series of primary wheels, an endwise-shiftable pivoted carriage having a series of registering wheels engaging said primary wheels, and a releasable pin and seat device normally limiting the movement of the carriage, of rotary crank means for raising the carriage upon its pivot to disengage the pin and seat device, shifting the carriage endwise in either direction, and lowering the carriage to reëngage the pin and seat device.

7. In a calculating machine, the combination with a casing having a series of primary wheels, an endwise-shiftable pivoted carriage having a series of registering wheels engaging said primary wheels, and means normally limiting the movement of the carriage, of a rotary crank rod provided at one end with a manually operable device and at the other end with a carriage-engaging device, for raising the carriage upon its pivot to disengage the limiting means, shifting the carriage endwise in either direction, and lowering the carriage to reëngage the limiting means.

8. In a calculating machine, the combination with a casing having a series of gear wheels, and an endwise-shiftable pivoted carriage provided at its lower forward edge with a series of notches, and having a series of numeral wheels engaging said gear wheels, of a rotary shaft having at its forward end an actuating device and at its rear end a double crank arm provided with pins engaging the notches of the carriage to raise the same upon its pivot and shift it endwise.

9. In a calculating machine, the combination with a casing having a series of gear wheels, and an endwise-shiftable pivoted carriage having a series of numeral wheels engaging said gear wheels, of means having engagement with the carriage to raise the same upon its pivot and shift it endwise, a rotary cam, and a pivoted device having an upper end engaging the carriage and a lower end engaging said cam to intermittently lock the carriage in depressed position and to release the carriage.

10. In a calculating machine, the combination with a casing having a series of gear wheels, and an endwise-shiftable pivoted carriage having a series of numeral wheels engaging said gear wheels, of means having engagement with the carriage to raise the same upon its pivot and shift it endwise, a rotary cam having a notch, and a pivoted device having an upper end engaging the carriage and a lower end engaging said cam to lock the carriage in depressed position, said device having release from the carriage upon engagement of said lower end with said notch.

In testimony whereof I affix my signature, in the presence of two witnesses.

FRANK S. BALDWIN.

Witnesses:

ANSELM P. ANDERSON,
FRANKLIN R. WAGNER.